United States Patent
Duan et al.

(10) Patent No.: US 9,846,586 B2
(45) Date of Patent: Dec. 19, 2017

(54) CREATING A VIRTUAL MACHINE AND CLOUD SERVER

(71) Applicant: International Business Machines Corporation, Armonk, NY (US)

(72) Inventors: Ning Duan, Beijing (CN); Ke Hu, Beijing (CN); Jian Ming Zhang, Beijing (CN); Kai Tang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 14/039,850

(22) Filed: Sep. 27, 2013

(65) Prior Publication Data

US 2014/0096136 A1   Apr. 3, 2014

(30) Foreign Application Priority Data

Sep. 29, 2012  (CN) .......................... 2012 1 0375360

(51) Int. Cl.
*G06F 9/455*     (2006.01)
*G06F 9/445*     (2006.01)

(52) U.S. Cl.
CPC .......... *G06F 9/455* (2013.01); *G06F 9/45558* (2013.01); *G06F 8/61* (2013.01); *G06F 2009/45562* (2013.01)

(58) Field of Classification Search
None
See application file for complete search history.

(56) References Cited

U.S. PATENT DOCUMENTS

| 5,247,683 A * | 9/1993 | Holmes et al. ................ 709/221 |
| 6,965,892 B1 * | 11/2005 | Uceda-Sosa et al. ........ 707/704 |
| 7,577,722 B1 * | 8/2009 | Khandekar et al. .......... 709/220 |

(Continued)

FOREIGN PATENT DOCUMENTS

| CN | 101071463 A | 11/2007 |
| CN | 101655798 A | 2/2010 |

(Continued)

OTHER PUBLICATIONS

Appsense user virtualization, AppSense Whitepaper (May 2011).

(Continued)

*Primary Examiner* — Mehran Kamran
(74) *Attorney, Agent, or Firm* — David M. Quinn; Michael J. Chang, LLC

(57) ABSTRACT

The present disclosure relates to a method and an apparatus for creating a virtual machine as well as a cloud server. A method for creating a virtual machine comprises: in response to a request from a user for creating a virtual machine, loading an operating system for said virtual machine based on a choice made by said user; assembling at least one application for said virtual machine based on a choice made by said user regarding said at least one application, including: based on pre-stored and application-related information, copying files involved in said application to a predetermined location on said virtual machine and changing public resource configuration managed by said operating system. The present invention enables users to flexibly install desirable software at the time of applying for creating a virtual machine without spending too much time.

9 Claims, 5 Drawing Sheets

(56) References Cited

U.S. PATENT DOCUMENTS

| | | | |
|---|---|---|---|
| 8,464,250 B1* | 6/2013 | Ansel | 718/1 |
| 9,015,848 B2 | 4/2015 | Lu et al. | |
| 9,047,486 B2 | 6/2015 | Lu et al. | |
| 2002/0138666 A1* | 9/2002 | Fujisawa | 709/330 |
| 2003/0014381 A1* | 1/2003 | McMillan et al. | 707/1 |
| 2005/0091346 A1* | 4/2005 | Krishnaswami et al. | 709/220 |
| 2005/0268232 A1* | 12/2005 | Stienhans et al. | 715/700 |
| 2007/0168478 A1* | 7/2007 | Crosbie | 709/221 |
| 2008/0047015 A1* | 2/2008 | Cornwall et al. | 726/25 |
| 2008/0104215 A1* | 5/2008 | Excoffier et al. | 709/223 |
| 2008/0184218 A1* | 7/2008 | Largman et al. | 717/168 |
| 2008/0307409 A1 | 12/2008 | Lu et al. | |
| 2009/0172662 A1* | 7/2009 | Liu | 718/1 |
| 2009/0260007 A1* | 10/2009 | Beaty et al. | 718/1 |
| 2010/0088699 A1* | 4/2010 | Sasaki | 718/1 |
| 2010/0192227 A1* | 7/2010 | Dai et al. | 726/24 |
| 2010/0235831 A1* | 9/2010 | Dittmer | 718/1 |
| 2011/0055299 A1* | 3/2011 | Phillips | 707/827 |
| 2011/0131330 A1* | 6/2011 | Beaty et al. | 709/227 |
| 2011/0184993 A1* | 7/2011 | Chawla et al. | 707/802 |
| 2011/0219385 A1* | 9/2011 | Jacobson et al. | 719/328 |
| 2011/0258326 A1* | 10/2011 | Hu et al. | 709/226 |
| 2012/0047503 A1 | 2/2012 | Lu et al. | |
| 2012/0054742 A1* | 3/2012 | Eremenko et al. | 718/1 |
| 2013/0019016 A1* | 1/2013 | Anderson et al. | 709/226 |
| 2013/0047160 A1* | 2/2013 | Conover | 718/1 |
| 2013/0067448 A1* | 3/2013 | Sannidhanam et al. | 717/169 |
| 2013/0104118 A1* | 4/2013 | Somani et al. | 717/173 |
| 2013/0111468 A1* | 5/2013 | Davis et al. | 718/1 |
| 2013/0132942 A1* | 5/2013 | Wang | 717/176 |
| 2013/0236877 A1* | 9/2013 | Zhou et al. | 434/350 |
| 2013/0239106 A1* | 9/2013 | Srinivasan et al. | 718/1 |

FOREIGN PATENT DOCUMENTS

| | | |
|---|---|---|
| WO | WO2006036277 A2 | 4/2006 |
| WO | WO2012106980 A1 | 8/2012 |

OTHER PUBLICATIONS

Smyth, "Automate application virtualisation to reduce costs and save time," Virtualization World 365 (Dec. 2011).
English Abstract of CN101655798A, Jiazhong Yu, Feb. 24, 2010.
English Abstract of CN101071463A, Lu Zhou Yu, Nov. 14, 2007.

* cited by examiner

CREATING A VIRTUAL MACHINE AND CLOUD SERVER

BACKGROUND

The present invention relates to a method for creating a virtual machine, and more specifically, relates to aspects regarding creating, running and restoration of a virtual machine.

PM (physical machine)-VM (virtual machine) technique is well known in the art. For example, a physical machine (e.g. a server) allocates corresponding hardware resource (which usually is a part of hardware resources of the physical machine) to multiple users in response to requests from the users, such that for these users it looks like they are individually using a separate physical machine (i.e. a virtual machine which comprises an operating system, corresponding hardware, applications, etc.). Users can remotely access a virtual machine through network, for example, a cloud server application. Thus, it is unnecessary for the user to separately purchase a high-performance computer at the expense of money; instead, projects (such as, research, mass operations, or the like) requiring a high-performance computer can be implemented by utilizing service providers that provide the above cloud service.

There generally includes the following ways to create a virtual machine for a user on a physical machine. One is that, when creating a virtual machine on a physical machine, a user can only make a choice regarding types of operating systems, but applications used on the virtual machine need to be installed by the user himself/herself. In such a mode, a service provider provides only an image file of the selected operating system. Image file technique is a technique commonly used at the time of loading operating systems and/or applications when creating a virtual machine. When an image file containing a specific operating system is used for a virtual machine, this specific operating system will be loaded onto the virtual machine. Obviously, if the service provider provides only an image file of an operating system, then applications required by a user need to be installed by the user himself/herself. Another fact is that, the user may request multiple virtual machines for improving working efficiency. For example, one user can apply for 10 virtual machines at the same time, and install the same application (s) for performing mass operations. In such a case, a user needs to install desirable software by himself/herself each time when applying for a virtual machine.

Another way to create a virtual machine is that a service provider provides some predetermined image files on a physical machine in advance. In these image files, combinations of specific operating systems and specific applications are already contained. Illustrative examples of these image files are shown in FIG. 4. For example, image file 1 contains operating system 1 and applications A, B and C. When image file 1 is used at the time of creating a virtual machine, the built virtual machine will obtain the operating system 1 on which applications A, B and C are installed. However, it is known that, there are dozens of popular operating systems (such as, Windows® Series available from Microsoft Company as well as operating systems like Linux Series), and the number of commonly-used applications is large. As shown in FIG. 4, when different applications are contained, even if only one application is different (application D in image file 2 and application E in image file 3), the final image file will be different. As a result, even providing only combinations of the most popular applications and common operating systems results in a large quantity of files. Thus, even if only image files covering the combinations of popular applications and operating systems are prepared on the physical machine in advance, a considerable amount of storage space will be taken, which, needless to say, is not cost-efficient.

SUMMARY

An object of the various embodiments of the present invention is to provide an improved method and apparatus for creating a virtual machine and a server.

According to one aspect of the present disclosure, there is provided a method for creating a virtual machine, including: in response to a request from a user for creating a virtual machine, loading an operating system for said virtual machine based on a choice made by said user; assembling at least one application for said virtual machine based on a choice made by said user, including: based on pre-stored and application-related information, copying files involved in said application to a predetermined location(s) in said virtual machine and changing public resource configuration managed by said operating system.

According to another aspect of the present disclosure, there is provided an apparatus for creating a virtual machine which is operationally coupled to a physical machine on which the virtual machine is built, wherein, said apparatus includes: a loading unit, configured to, in response to a request from a user for creating a virtual machine, load an operating system for said virtual machine based on a choice made by said user; and an assembling unit, configured to assemble at least one application for said virtual machine based on a choice made by said user, including: based on pre-stored and application-related information, copying files involved in said application to a predetermined location(s) in said virtual machine and changing public resource configuration managed by said operating system.

According to a further aspect of the present disclosure, a cloud server comprising the apparatus according to the above aspects of the present disclosure is also involved.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
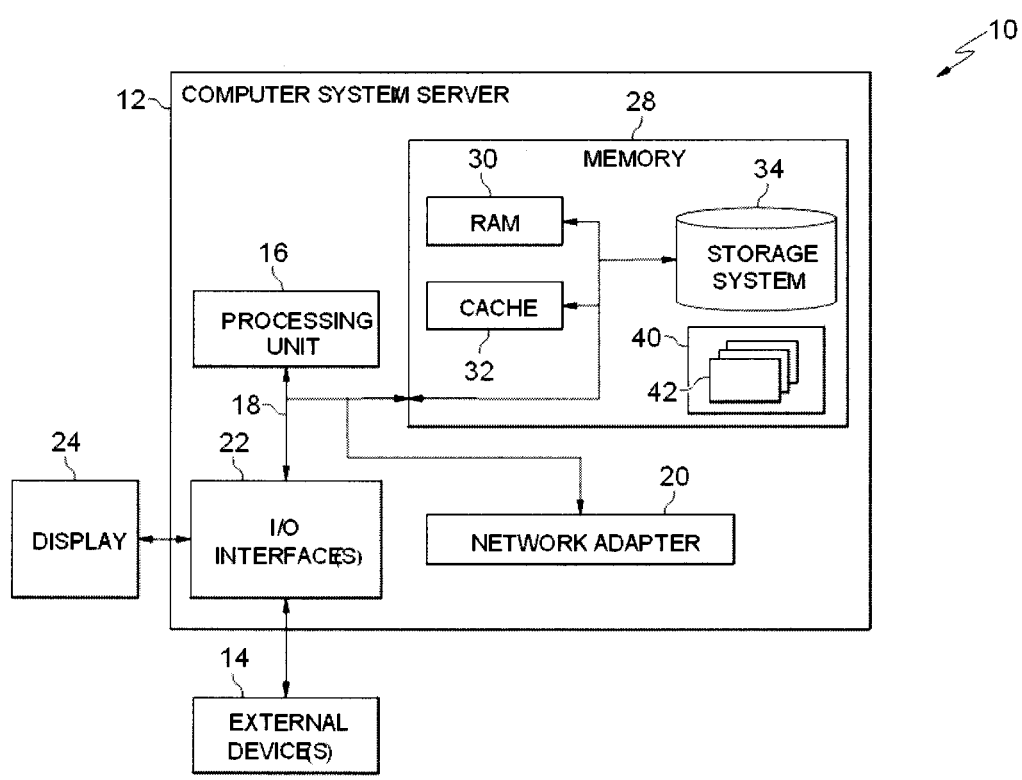
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
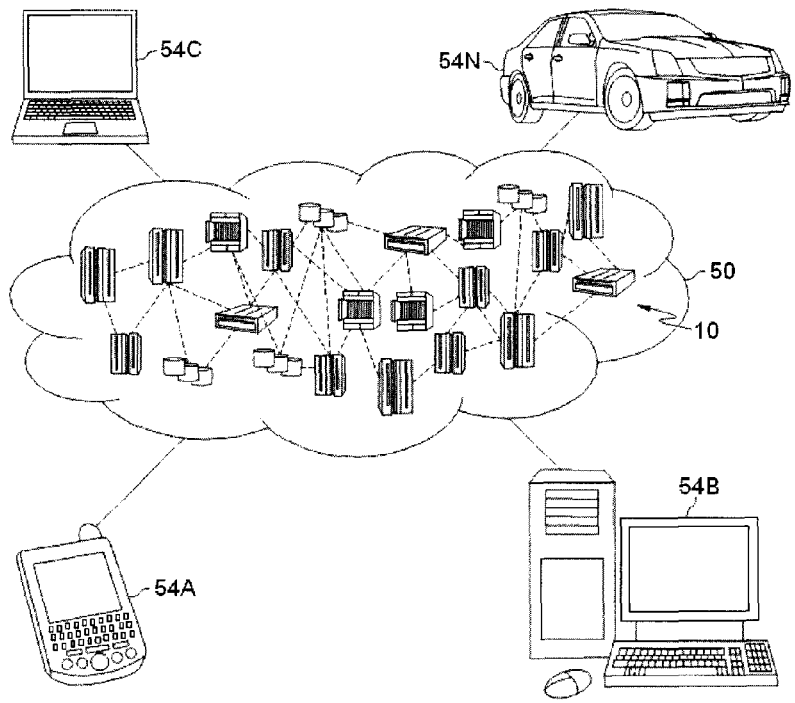
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
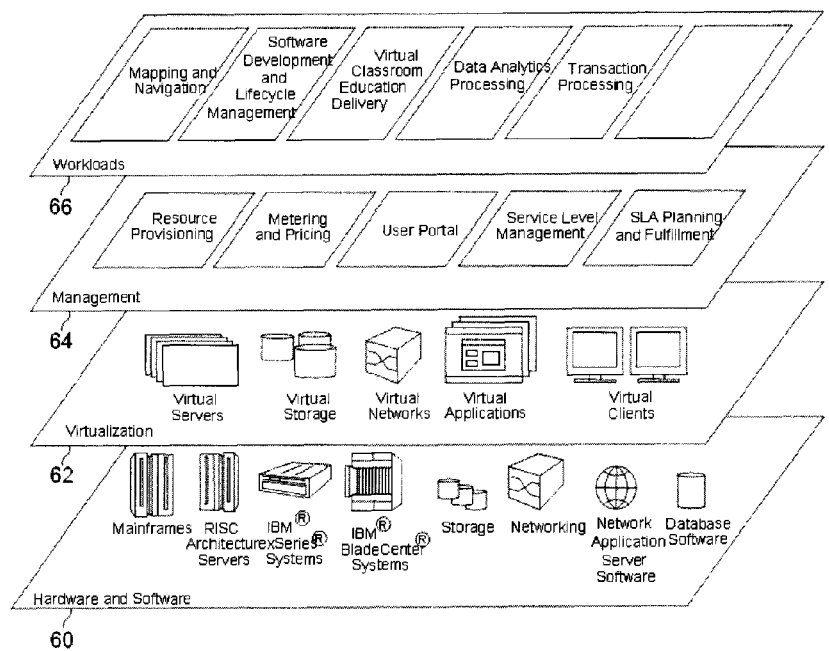
FIG. 3 depicts abstraction model layers according to an embodiment of the present invention.
Figure 4:
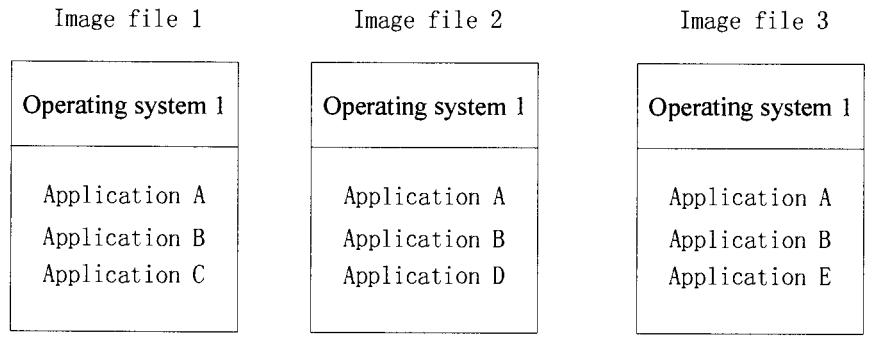
FIG. 4 shows examples of image files that need to be prepared in advance in the prior art.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing.

According to an embodiment of the present invention, there is provided a method for creating a virtual machine, including: in response to a request from a user for creating a virtual machine, loading an operating system for said virtual machine based on a choice made by said user; assembling at least one application for said virtual machine based on a choice made by said user, including: based on pre-stored and application-related information, copying files involved in said application to a predetermined location on said virtual machine and changing public resource configuration managed by said operating system.

One of ordinary skill in the art should understand that, as used herein, the term "assemble/assembling/assembled" indicates a way totally different from the usual way of "installing" an application.

Specifically speaking, one of ordinary skill in the art should appreciate that, the so-called "install/installing/installed" means a method of loading an application on a computer. In such a method, generally, an installation package (which generally is named as install.exe or seup.exe, or, other executable files having similar names) of an application is used. When running the above executable files, the computer actually executes a decompression processing, for decompressing various files of the application onto the computer. For some software, running the above executable files may also trigger downloading of additional or all desirable files from network.

According to the present disclosure, the so-called "assemble/assembling/assembled" is a way different from the above way of installing. Below, the "assembling" technique according to the present disclosure will be described in conjunction with instances of particular applications.

Figure 5:
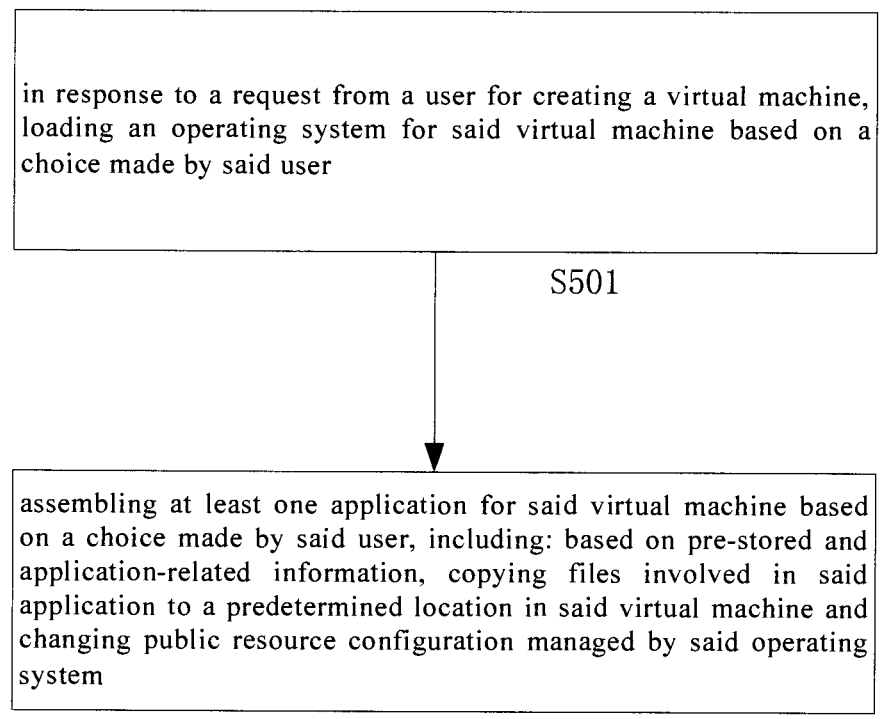
FIG. 5 shows a flowchart of a method according to an embodiment of the present invention.

FIG. 5 shows a flowchart of a method according to an embodiment of the present invention. At step 501, in response to a request from a user for creating a virtual machine, an operating system is loaded for the virtual machine based on a choice made by the user. For example, at step 501, the user can choose his/her desirable operating system, such as Windows® Series available from Microsoft Company (e.g. Windows98®) or operating systems like Linux Series (e.g. Red-flag Linux). At step 502, at least one application is assembled onto the virtual machine based on a choice made by the user, which includes: based on pre-stored and application-related information, copying files involved in the application to a predetermined location(s) in the virtual machine and changing public resource configuration managed by the operating system.

One of ordinary skill in the art should understand that, steps irrelevant to the technical solutions of the present disclosure are omitted in order to not obscure the gist and idea of the present disclosure. For example, when creating a virtual machine, a user will firstly choose a desirable hardware resource, such as, desirable CPU performance, desirable storage space, or the like for the virtual machine. However, this step is irrelevant to the gist of the present disclosure, and thus description thereof is omitted.

Below, by taking the combination of WindowsXP® operating system and Word® application (hereinafter, referred to as Word) available from Microsoft Company as an example, how to assemble this software onto a virtual machine will be described. When observing the Word application that has been installed on the computer (virtual machine), it can be found that files involved in this application are stored in one or more predetermined folders. For example, storage path for a part of the files is "C:\Program Files\Microsoft Office", storage path for another part of the files is "C:\Users\xxx\AppData\Roaming\Microsoft\Office", and storage path for a further another part is "C:\ProgramData\Microsoft\OFFICE" (here, the characters "xxx" refers to the user name of the operating system, as known in the art).

In other words, for an application that has been installed in a specific operating system, it is known what files this application involves and where these files are stored. As a result, in an embodiment according to the present invention, for example, various files involved in Word application and the storage locations of these files can be pre-stored in the database of the physical machine. When a user chooses the combination of WindowsXP® and Word, the physical machine directly copies these files to a designated location (i.e. the three paths mentioned above) in the virtual machine without undergoing an installation processing.

On the other hand, the installation of applications also involves configuration of public resources managed by the operating system. One example of the public resources managed by an operating system is registry table of WindowsXP® operating system. It is known that, registry table is an important database in WindowsXP® operating system for storing configuration settings of a system and applications.

When installing an application, an installation program will automatically set the registry table. In an embodiment according to the present disclosure, when observing the installed Word application, it can be found that changes and additions of items in the registry table made by Word application are also known. In other words, for an installed application, it is known which register items are changed or added by this application. Thus, in an embodiment according to the present disclosure, for a specific operating system (including registry table), configuration made by the installed Word application for register items can be stored in advance. After the files involved in Word application are copied, the registry table is configured directly according to the stored configuration.

One of ordinary skill in the art should appreciate that, although explanations have been made above with reference to the specific combination of WindowsXP® and Word, the present disclosure is neither limited to one application, nor to the above specific combination. One of ordinary skill in the art should appreciate that, the above described technical solution is also applicable to other applications (including a plurality of applications) and systems as well as different combinations thereof.

Although explanations have been made by taking registry table as an example, one of ordinary skill in the art should understand that, the registry table herein is merely one example of public resources on a computer (a virtual machine). The public resources on a computer (a virtual machine) are not limited to registry tables. For example, some applications relate to configurations of computer ports, such as, printer ports. On the other hand, for different operating systems, the types of public resources are different as well. For example, under Linux operating system, the installed application relates to configurations of environment variables.

In a word, in an embodiment according to the present disclosure, different ways are employed for installing applications. Files involved in an application as well as information related to the application are stored on a physical machine in advance. In one embodiment, application-related information includes corresponding storage locations of files involved in the application under various operating systems. In addition, configuration of public resources (which are managed by various operating systems) made by applications is also stored in advance. When a user wishes to install an application on the virtual machine setup for him/her, the physical machine (PM) according to the invention directly copies the files involved in the application to the virtual machine according to a pre-stored location(s). Subsequently, the public resources managed by an actual operating system are changed according to the pre-stored configuration of public resources made by the application.

As described above, the way of "installing" in the prior art relates to a decompressing process and may also include a process of downloading some files from the network. However, according to the present disclosure, the way adopted for assembling an application is copying, which is a faster way compared with decompression. In addition, when files involved in an application are prepared in advance, the process of downloading from the network can be avoided. All these can improve the efficiency for preparing a virtual machine and shorten a user's waiting time.

With the technical solution recited in the present disclosure, users are enabled to flexibly choose a desirable application, and the physical machine can provide a service for automatically assembling specific applications. On the other hand, with one technical solution recited in the present disclosure, what have been stored are merely files of the application itself, while storage locations of files under various operating systems generally are stored in a form of data list or database, which will only occupy relatively small storage space. Thus, with the embodiments according to the present disclosure, it is unnecessary to store a plurality of image files on a physical machine (a cloud server) in advance, and hence hardware resources on the physical machine can be significantly saved.

Below, an alternative embodiment according to the present disclosure will be described in conjunction with the accompanying drawings.

Although it is possible to directly call installation files to install the selected applications for a client after loading an operating system for a virtual machine in response to a choice made by the client, in some cases, this will cause problems. As described above, when installing an application, configuration of public resources may be involved. Since installation is executed automatically at a physical machine terminal instead of being executed by a user autonomously, configuration of public resources made by each application is by default.

If it is assumed that there are two or more applications whose installations involve configuration of the same public resource, then the installed applications may have problems. For example, the application installed later may cover or rewrite the configuration of public resource made by the application installed previously. When serious, this may make all these applications fail to be used normally.

For example, it is assumed that the user wishes to install Word application and WPS application available from Kingsoft Company onto the virtual machine. It is known that, these two types of software both may be used for processing .doc files. For example, under WindowsXP○R operating system, after a Word application has been installed, the installation program will automatically configure the registry table such that the Word application becomes a default application for opening .doc files. However, likewise, the WPS application installed latterly also will configure the registry table such that it also becomes a default application for opening .doc file. As a result, if the user actually wishes to use the Word application as a default application for processing .doc files, the above installations departs from the user's expectation, and hence the user needs to manually change the configuration.

One of ordinary skill in the art should understand that, the above examples are merely simple descriptions presented for easy understanding. In practical applications, conflicts among public resource configurations usually would cause more serious problems, such as, making multiple related applications all fail to run or causing system crash.

Exactly because of the above problems, this way is basically not adopted in practice.

Figure 6:
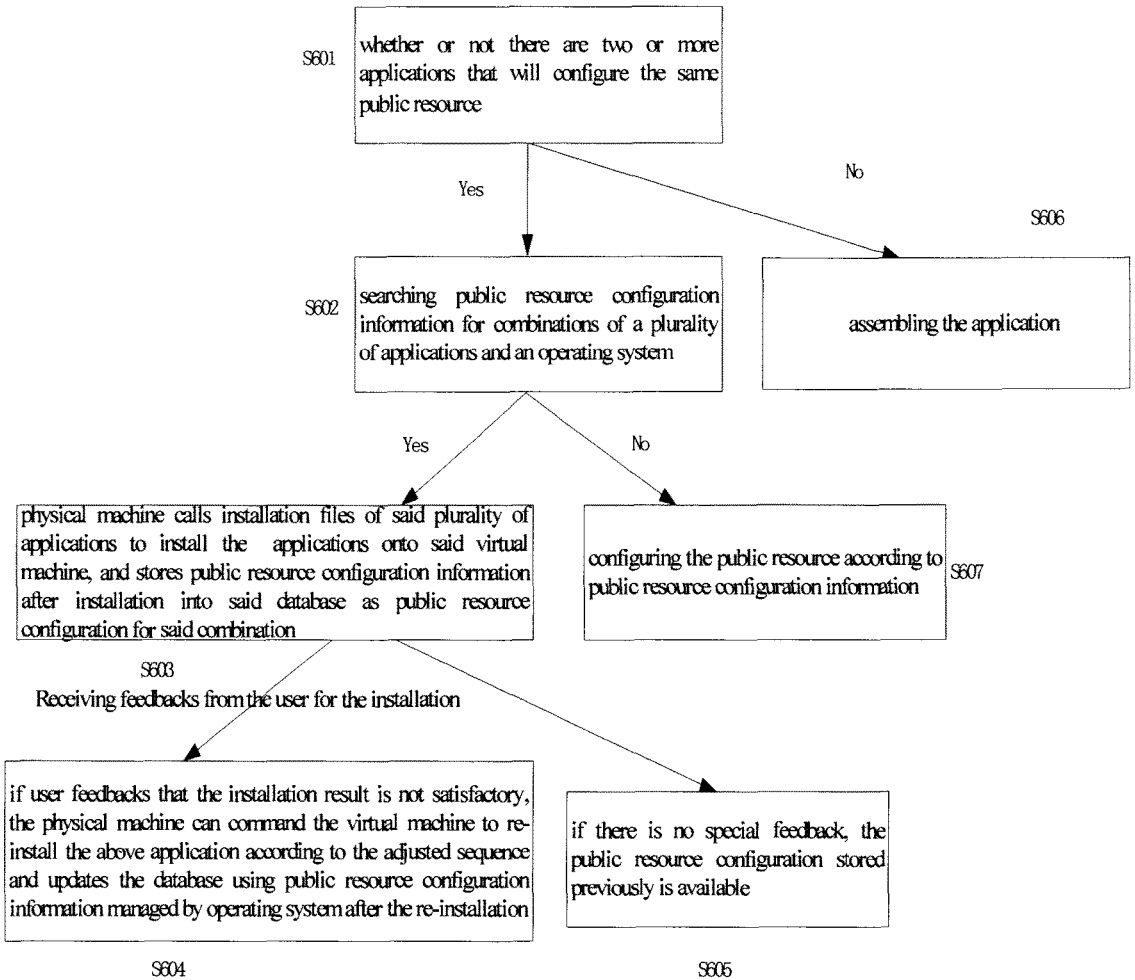
FIG. 6 shows a flowchart of a method according to an alternative embodiment of the present invention.

In an alternative embodiment of the present disclosure, when using the technical solution of "assembling", the above problems will not occur. Below, with reference to FIG. 6, an alternative embodiment of the present disclosure will be described.

At step S601, in response to the user choosing a plurality of applications, it is determined whether or not there are two or more applications that will configure the same public resource. As described above, the configuration information of public resources made by the provided applications has been stored in advance. By comparing such information among the plurality of applications, it can be determined whether or not there are two or more applications that will configure the same public resource, for example, the same register item or the same computer port.

If there are no such applications, the method proceeds to step S606. At this point, the above applications can be assembled directly according to the above-described way.

If there are two or more applications that will configure the same public resource, the method proceeds to step S602, i.e. searching public resource configuration information (e.g. configuration of specific items in the registry table or configuration of ports) for combinations of the plurality of applications and specific operating systems in the database of the physical machine. Needless to say, the pre-stored public resource configuration information represents public resource configuration that has been verified and will not bring problems for the combinations. Using such public resource configuration information will not result in the above problems.

After step S602, when public resource configuration information for combinations of specific operating systems and applications exists in the database of the physical machine, the method proceeds to step S607. Since there are available public resource configuration information, at this point, configuration of the public resource is carried out according to such information and then can obtain the assembled applications.

According to the present disclosure, there are many ways for obtaining the pre-stored public resource configuration information described above. For example, in an embodiment according to the present disclosure, it is possible to collect such information from other virtual machines that are built on the physical machine. For example, other virtual machines select the same combination of applications and operating system. When it is observed that a user of these virtual machines does not feedback any errors or uninstall some applications, it can be deemed that this user's public resource configuration is available for this combination, i.e. being verified. On the other hand, this physical machine (e.g. cloud server) can collect such information from other physical machines (external sources) through network. One of ordinary skill in the art should understand that, other ways can be employed for collecting such information.

One of ordinary skill in the art should appreciate that, at steps S606 and S607, although it involves assembling multiple applications, it is still possible to load the plurality of applications onto the virtual machine according to the assembling way described above. In one embodiment according to the present disclosure, according to the pre-stored and application-related information, files involved in all of the applications can be firstly copied, and finally public resources for all the applications are configured at one time. Of course, each application can be assembled one by one.

After step S602, if there is no public resource configuration information for the combination in the database of the physical machine, the method proceeds to step S603. At step S603, the physical machine calls installation files of the plurality of applications to install the plurality of applications on the virtual machine, and stores public resource configuration information of the virtual machine after installation into the database as public resource configuration for current combination. At this point, although it is known that installing these applications on a specific operating system may result in conflicts regarding public resource configurations, the physical machine calls installation files of applications to perform installation on the virtual machine since the physical machine cannot find public resource configuration information that has been verified as available. After the completion of installation, the physical machine will store the configuration information for the combination in the database as public resource configuration information for current combination.

As described above, such way of installing may bring problems to the running of the virtual machine. However, this is not absolute. Taking a case in which the public resource is a registry table as an example, during a practical installation, installation sequence, desirable configurations selected by the user at the time of installing applications (e.g. not select Word as a default application for opening .doc files), or the like all will influence the final configuration of public resources after installation.

Thus, after undergoing the above installation steps, the virtual machine may still be ok. As a result, at this point, the physical machine performs installation according to a test sequence and seeks an available public resource configuration.

For such situation, at step S604, the physical machine receives a feedback from a user about installation result.

If the user feedbacks that installation result is not satisfactory, this may indicate that the installation causes problems. At this point, the physical machine can take the collected public resource configuration information as unavailable, for example, can directly discard such information. In this case, the physical machine can command the virtual machine to re-install the above application according to a different sequence and update the database using the public resource configuration information on the virtual machine after the completion of re-installation. In another embodiment, it is also possible to try other application configurations after completing the installation of the application, so as to introduce different public resource configurations. If the user has no special feedback, it is deemed that the public resource configuration caused by the installation is available. At this point, the public resource configuration stored in the database becomes public resource configuration available for this combination and can be used in situations where this combination exists.

At step S605, if the user does not give any special feedback, it is deemed that the public resource configuration stored previously is available. This public resource configuration information then can be used in combinations of specific operating system and applications.

The installation process in the prior art is a one-way process. During this process, the installation process only focuses on and serves the installation of its own application. Decompressing files and configuring public resources during the installation process are an inseparable whole. However, in the so-called assembling technique according to the present disclosure, not only the size of stored image files can be reduced as described above, but also copying files and configuring public resources can be separately handled. The latter will bring additional advantages. For example, conflicts caused during the installation process of a plurality of applications can be avoided.

Below, the apparatus for creating a virtual machine according to the present disclosure will be described in conjunction with the accompanying drawings.

Figure 7:
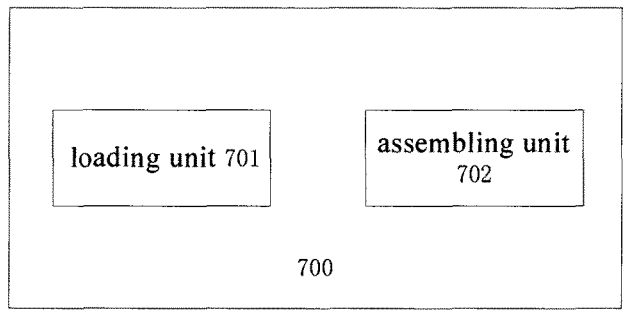
FIG. 7 shows a schematic block view of an apparatus 700 for creating a virtual machine according to an embodiment of the present invention.

FIG. 7 shows a schematic block view of an apparatus 700 for creating a virtual machine according to one embodiment of the present disclosure. One of ordinary skill in the art can understand that, the apparatus 700 for creating a virtual machine can be operationally coupled to a physical machine on which the virtual machine is built. As shown in the figure, the apparatus 700 includes a loading unit 701 and an assembling unit 702. In one embodiment according to the present disclosure, the apparatus 700 can directly obtain or indirectly obtain from the physical machine the user's input. The loading unit 701 can load the operating system selected by the user for the virtual machine in response to a request from the user for creating a virtual machine. The assembling unit 702 can assemble at least one application for the virtual machine based on the user's choice. In one embodiment of the present disclosure, the assembling process includes: based on pre-stored and application-related information, copying files involved in the application to a predetermined location(s) in the virtual machine and changing public resource configuration managed by the operating system in the virtual machine.

Figure 8:
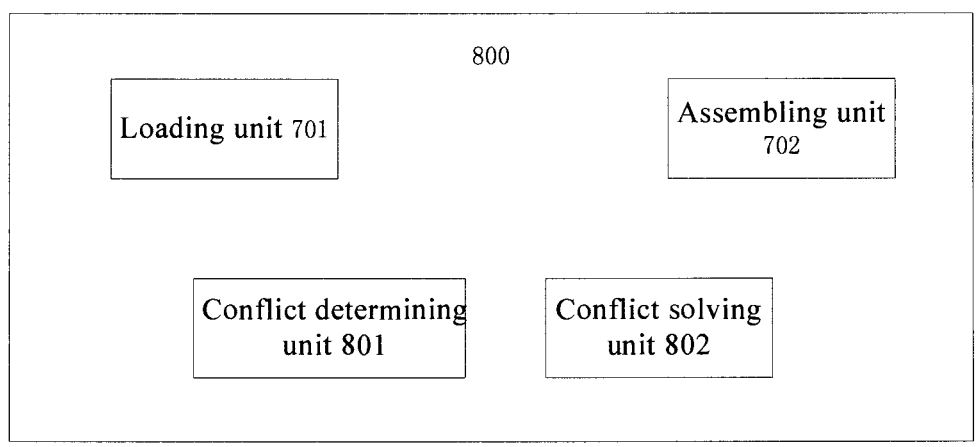
FIG. 8 shows a schematic block view of an apparatus 800 according to an alternative embodiment of the present invention.

FIG. 8 shows a schematic block view of an apparatus 800 according to an alternative embodiment of the present disclosure. As shown in the figure, in the apparatus 800, in addition to the loading unit 701 and the assembling unit 702 shown in FIG. 7, there also includes a conflict determining unit 801 and a conflict solving unit 802. As described above, there may be a case in which different applications will configure the same public resource. The conflict determining unit 801 and the conflict solving unit 802 are provided as a further solution. In one embodiment according to the present disclosure, the conflict determining unit 801 is configured to determine whether or not there are two or more applications that will configure the same public resource among the plurality of applications selected by the user. The conflict solving unit 802 is configured to search public resource configuration information for combinations of the currently-selected plurality of applications and operating system in the database of the physical machine, when the conflict determining unit 801 determines that there are two or more applications that will configure the same public resource. When the above-described public resource configuration information is present, the conflict solving unit 802 provides the public resource configuration information to the assembling unit 702 for assembling the plurality of applications. On the other hand, when public resource configuration information for a specific combination is absent, the conflict solving unit 802 calls installation files of the plurality of applications to install the plurality of applications on the virtual machine, and stores public resource configuration information on the virtual machine after the completion of installation onto the database of the physical machine.

As described above, the conflict solving unit 802 can be further configured to receive a feedback from a user about installation results. When the feedback indicates that he/she accepts the installation result, the public resource configuration information on the virtual machine after installation can be regarded as verified public resource configuration information for the combination and this verified public resource configuration information can be used for updating the database. On the other hand, when the user feedbacks that the installation result of application is not satisfactory, the conflict solving unit 802 is configured to re-install application for the virtual machine according to different installation sequences or different application configurations, and obtains possibly different public resource configuration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for creating a virtual machine in a physical machine, comprising:
    in response to a request from a user for creating the virtual machine, loading an operating system for the virtual machine based on a choice made by the user; and
    assembling at least one application for the virtual machine based on a choice made by the user, including: pre-storing application information in a database of the physical machine, wherein the pre-stored application information comprises files involved in the application, storage locations of files involved in the application under the operating system, and configuration information of public resources made by the application; based on the pre-stored application information, i) upon the user choosing a particular application in combination with the operating system, copying the files involved in the application from the database in the physical machine directly to one or more predetermined locations in the virtual machine without undergoing an installation process; and ii) changing a public resource configuration managed by the operating system, wherein the public resource comprises at least one registry table, and wherein the public resource configuration is changed by changing registry items in the registry table in advance of installation using changes to the registry known based on the particular application in combination with the operating system chosen by the user;
    in response to the user choosing a plurality of applications, changing the public resource configuration managed by the operating system by:
    determining whether or not there are among the plurality of applications two or more applications that will configure a same public resource,
    if there are two or more applications that will configure the same public resource, then searching public resource configuration information for a combination of the plurality of applications and the operating system in a database of a physical machine;
    if the public resource configuration information is present, then changing the public resource configuration managed by the operating system according to the public resource configuration information; and
    if the public resource configuration information for the combination is absent, installing the plurality of applications onto said virtual machine, and storing public resource configuration information managed by the operating system after installation on the database as the public resource configuration for the combination;
    creating the virtual machine in the physical machine.

2. The method according to claim 1, wherein the physical machine receives feedback from the user about installation results, the method further comprising:
    in response to a feedback that the user is not satisfied with the installation results, reinstalling the applications for the virtual machine in a different sequence; and
    updating the database using public resource configuration information on the virtual machine after re-installation.

3. The method according to claim 2, further comprising:
    the physical machine obtaining public resource configuration information for the combination of the plurality of applications and the operating system from other virtual machines built on the physical machine and from external sources.

4. The method according to claim 1, wherein for Windows operating system, the public resources include the at least one registry table, and for Linux operating system, the public resource include at least one environment variable.

5. An apparatus for creating a virtual machine, which is operatively coupled to a physical machine on which the virtual machine is built, the apparatus comprising one or more processors coupled to a system memory configured to:
    in response to a request from a user for creating the virtual machine, load an operating system for the virtual machine based on a choice made by the user;
    assemble at least one application for the virtual machine based on a choice made by the user, including: pre-storing application information in a database of the physical machine, wherein the pre-stored application information comprises files involved in the application, storage locations of files involved in the application under the operating system, and configuration information of public resources made by the application; based on the pre-stored application information, upon the user choosing a particular application in combination with the operating system, copying the files involved in the application from the database in the physical machine directly to one or more predetermined locations in the virtual machine without undergoing an installation process; and changing a public resource configuration managed by the operating system, wherein the public resource comprises at least one registry table, and wherein the public resource configuration is changed by changing registry items in the registry table in advance of installation using changes to the registry known based on the particular application in combination with the operating system chosen by the user;

determine whether or not there are among the plurality of applications two or more applications that will configure a same public resource selected by the user;

in response to determining that there are two or more applications that will configure the same public resource, search public resource configuration information for a combination of the plurality of applications and the operating system in a database of the physical machine, and:

if the public resource configuration information is present, provide the public resource configuration information for assembling the plurality of applications;

if the public resource configuration information for the combination is absent, call installation files of the plurality of applications to install the plurality of applications onto the virtual machine, and store public resource configuration information managed by the operating system after installation onto the database as the public resource configuration for the combination;

create the virtual machine in the physical machine.

6. The apparatus according to claim 5, receive feedback from the user about installation results and adjust an installation sequence in response to the feedback from the user, re-install the applications for the virtual machine according to the adjusted installation sequence and update the database using public resource configuration information on the virtual machine after re-installation.

7. The apparatus according to claim 5, wherein the physical machine is configured to obtain public resource configuration information for the combination of the plurality of applications and the operating system from other virtual machines built on said physical machine and from external sources.

8. The apparatus according to claim 5, wherein for Windows operating system, the public resources include the at least one registry table, and for Linux operating system, the public resource include at least one environment variable.

9. A cloud server comprising an apparatus for creating a virtual machine, which is operatively coupled to a physical machine on which the virtual machine is built, the apparatus comprising one or more processors coupled to a system memory configured to:

in response to a request from a user for creating the virtual machine, load an operating system for the virtual machine based on a choice made by the user;

assemble at least one application for the virtual machine based on a choice made by the user, including: pre-storing application information in a database of the physical machine, wherein the pre-stored application information comprises files involved in the application, storage locations of files involved in the application under the operating system, and configuration information of public resources made by the application; based on the pre-stored application information, upon the user choosing a particular application in combination with the operating system, copying the files involved in the application from the database in the physical machine directly to one or more predetermined locations in the virtual machine without undergoing an installation process and changing a public resource configuration managed by the operating system, wherein the public resource comprises at least one registry table, and wherein the public resource configuration is changed by changing registry items in the registry table in advance of installation using changes to the registry known based on the particular application in combination with the operating system chosen by the user;

determine whether or not there are among the plurality of applications two or more applications that will configure a same public resource selected by the user;

in response to determining that there are two or more applications that will configure the same public resource, search public resource configuration information for a combination of the plurality of applications and the operating system in a database of the physical machine, and:

if the public resource configuration information is present, provide the public resource configuration information for assembling the plurality of applications;

if the public resource configuration information for the combination is absent, call installation files of the plurality of applications to install the plurality of applications onto the virtual machine, and store public resource configuration information managed by the operating system after installation onto the database as the public resource configuration for the combination;

create the virtual machine in the physical machine.

* * * * *